Patented July 12, 1927.

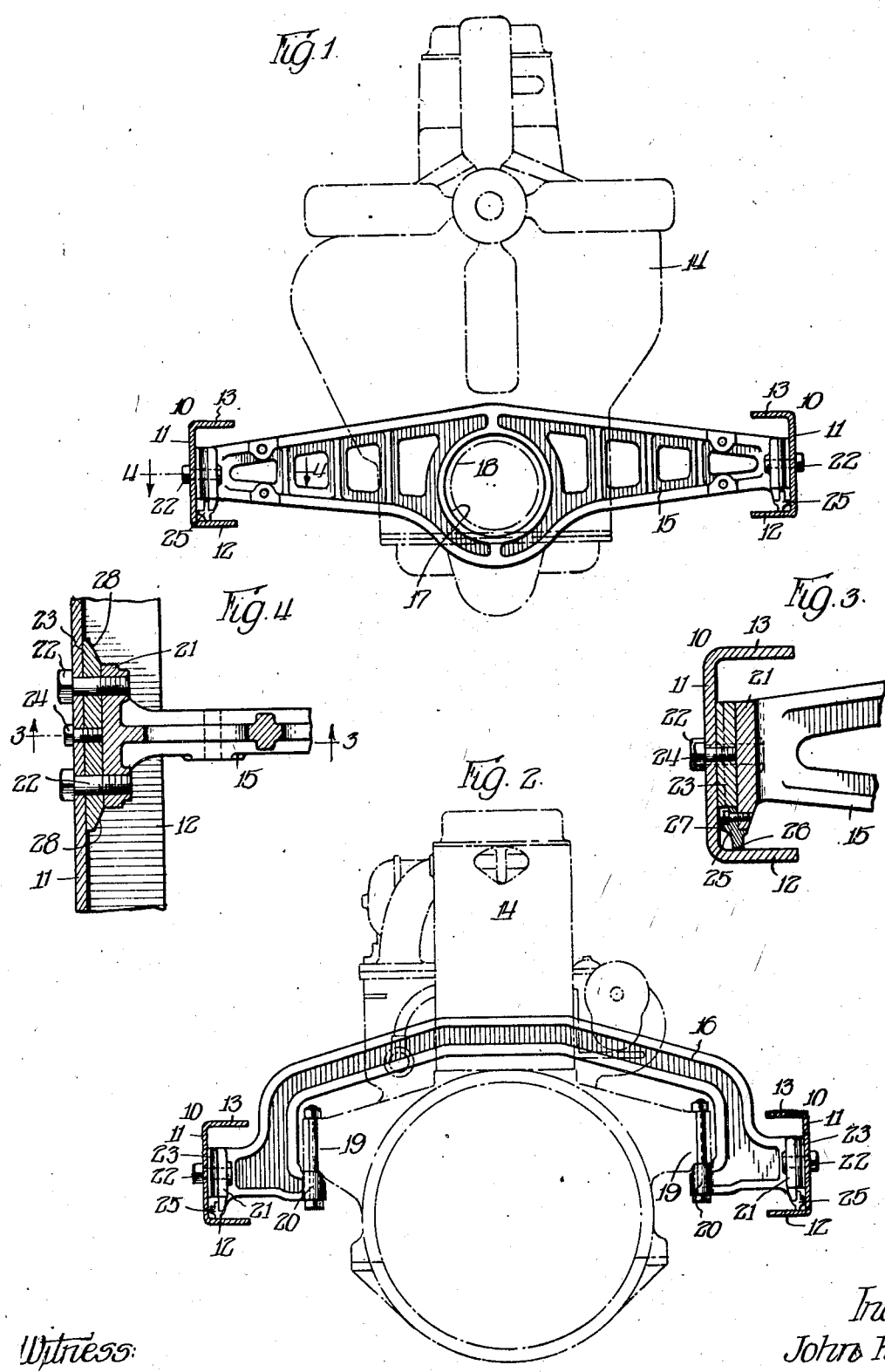

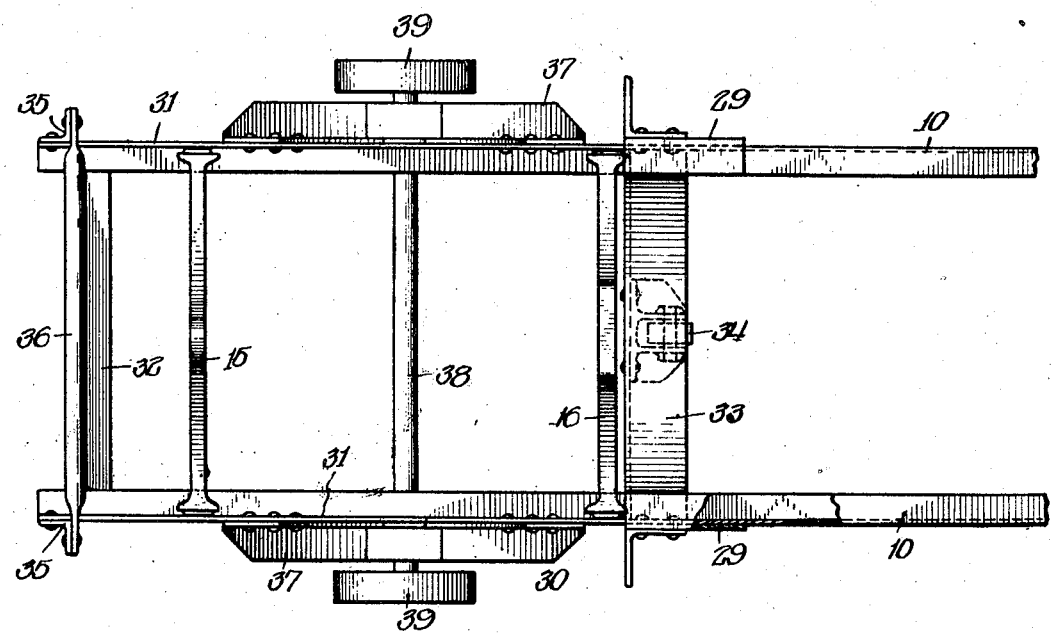
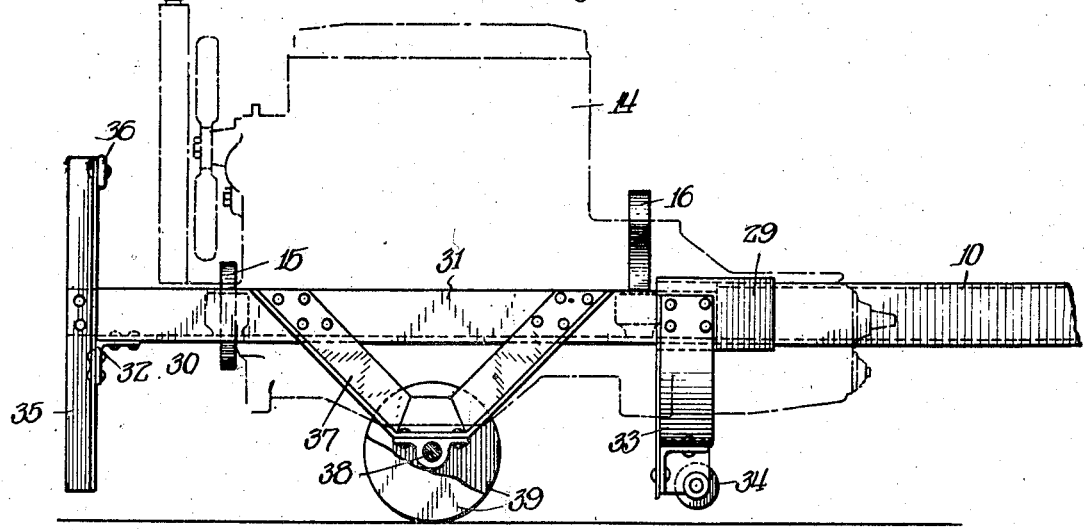

1,635,388

UNITED STATES PATENT OFFICE.

JOHN RIISE, OF DOYLESTOWN, OHIO.

MOTOR VEHICLE.

Application filed May 29, 1924. Serial No. 716,564.

This invention relates to motor vehicles and more particularly to means whereby the motor may be removably supported in a vehicle chassis and easily and quickly applied thereto and withdrawn therefrom.

Heretofore motors have been mounted upon sub-frames of various descriptions, including a plurality of longitudinally extending members and a plurality of transversely extending members, which sub-frames in turn have been mounted on the chassis side members. Such sub-frames are large, heavy, sometimes complicated, impractical, and, due to frictional resistances, are difficult to apply to the chassis side frame members and to withdraw same therefrom.

Accordingly, one object of my invention is to overcome the above-mentioned disadvantages and to eliminate the use of sub-frames as such, and to removably support the power plant of a motor vehicle on the chassis side frame members in a simple manner, whereby the power plant may be easily and quickly applied to and withdrawn from the chassis frame and simply attached thereto.

Another object of the invention is to provide means whereby a power plant may be quickly and easily handled in a shop, quickly and easily applied to and withdrawn from a motor vehicle in a manner to meet all of the requirements for the satisfactory handling of power plants in applying same to and withdrawing same from motor vehicles.

These and other objects are accomplished by means of the arrangement disclosed on the accompanying sheets of drawings, in which—

Figure 1 is a transverse sectional view of the side chassis members of the motor vehicle and showing the front motor support in front elevation and applied to said chassis members;

Figure 2 is a similar view showing the rear motor supporting member applied to the chassis side members which are shown in section, a power plant being shown in dotted lines in both Figures 1 and 2;

Figure 3 is an enlarged detail view showing one end of the front motor support applied to the associated chassis side member and taken in the plane of line 3—3 of Figure 4;

Figure 4 is a detail sectional view taken in the plane of line 4—4 of Figure 1;

Figure 5 is a side elevation of a shop truck for handling power plants of a motor vehicle and shown in a position with respect to chassis side members whereby the power plant may be slid from the shop truck onto the chassis; and Figure 6 is a top plan view of the same arrangement with the parts in the same associated position with the power plant removed.

The various novel features of the invention will be apparent from the following description and drawings, and will be particularly pointed out in the appended claims.

Referring to the figures of the drawings, it will be seen that the motor vehicle is illustrated by the chassis side frame members 10, each of which is of channel section, including a web 11, a lower flange 12 and an upper flange 13. As mentioned above, instead of supporting the motor upon a sub-frame including the usual large number of members, I have provided an arrangement wherein the motor 14 is supported by means comprising but two members 15 and 16, both of which extend between and removably engage the chassis side frame members 10. The front motor supporting member 15 has a central opening 17 for receiving a front housing portion 18 of the motor in a manner such that the motor is free to have somewhat of a swiveling motion with respect to the supporting member 15. Laterally extending lugs 19 on the motor 14 rest upon and are secured to inwardly extending lugs 20 on the rear transverse motor supporting member 16. Accordingly, the motor has in effect, a three-point suspension. The rear transversely extending motor supporting member 16 is arched intermediate its ends to receive thereunder a portion of the motor and both the front and rear motor supporting members 15 and 16 respectively, are provided with end flanges 21. These transverse motor supporting members 15 and 16 are secured to the chassis members 10 by bolts 22, which extend not only through the flanges 11 of said chassis members 10, and through the flanges 21, but also through spacers 23, each spacer in turn being secured to the associated flange 11 by a bolt 24. Secured to the lower end of each of the flanges 21 is a member 25 having a downwardly extending foot 26 which rides or slides on the associated lower flange of the chassis members 10, whereby the power plant, including the motor 14, may be readily moved into and out of normal position. Each of the members 25 also has a laterally extending projection 27 which acts as a side guide in engaging at times the associated web 11 of the chassis members 10. Normally, of course, the projections 27 do not engage the webs 11 but as the power plant is being slid into and out of its normal position on the projections 27 it engages the webs 11 for guiding purposes. The spacers 23 remain in position on the webs 11 of the chassis members 10 and are preferably provided with tapered portions 28 for guidedly receiving the flanges 21 as the motor supporting members 15 and 16 are slid into operative association with said spacers 23.

The motor supporting members 15 and 16 in effect might be said to form a part of the motor frame, but in any event with the supporting members 15 and 16 as arranged, they, and also the motor or power plant may be easily and quickly moved into normal position on the chassis and out of said position in the application and withdrawal of the power plant, the power plant unit having a free sliding and guiding movement as it is moved into and out of its normal position by virtue of the sliding members 26 and the guiding members 27. In this same connection it will be appreciated that considerable clearance is allowed between the flanges 21 on the motor supporting members 15 and 16 with respect to the webs 11, except at the points where the spacers 23 are located, at which points the motor supporting arms are secured to the chassis members 10. By means of this arrangement the use of a motor sub-frame is obviated and but two motor supporting members are used, and at the same time the whole unit can be easily and quickly applied to and withdrawn from the motor vehicle chassis.

In this connection I have provided what may be called a shop truck, shown in Figures 5 and 6, which greatly facilitates the application of the power plant 14 to the motor vehicle and the removal of same therefrom. For example, if it is desired to remove a power plant from a motor vehicle the side rear channel members 29 of the shop truck 30 may be moved into interlocking relationship with respect to the chassis side members 10, as indicated in Figures 5 and 6, whereupon the power plant 14 may be given a sliding movement from the chassis onto the shop truck 30. If it is desired to put another power plant onto the chassis frame, same may be done by withdrawing the shop truck 30 and moving another shop truck loaded with a power plant into the position shown in Figures 5 and 6, whereupon that power plant may be given a sliding movement onto the chassis members 10. The main portion of the side members 31 of the shop truck 30 are tied together at their front ends by an angle bar 32 and at their rear ends by a bar 33 bent or arched to permit of the reception of the power plant on the shop truck. This arched bar 33 is provided with a wheel 34 to prevent tipping of the truck at the rear. At the front the truck is provided with legs 35 to prevent tipping of the truck at that end, there being a handle bar 36 extending between the upper ends of the legs 35. Secured to the side members 31 of the shop truck 30 are brackets 37 in which a cross axle 38 is secured, there being wheels 39 mounted on the ends of the axle whereby the shop truck may be wheeled from place to place.

It will be appreciated that power plants may be easily and quickly moved from one place to another on such a shop truck, which may be moved into a cooperative position with respect to the chassis of the motor vehicle to greatly facilitate mounting a power plant on said chassis and removing one therefrom. The power plant may be placed upon or withdrawn from the shop truck 30 in any suitable manner, such as by a crane.

It is my intention to cover all modifications of the invention falling within the spirit and scope of the following claims.

I claim:

1. In a motor vehicle, the combination of a chassis having side members, a motor, and motor supporting means comprising but two members, both of which extend between said chassis side members, spacers secured to said side members for positioning said supporting means, said motor supporting members each having downwardly extending feet for sliding on one portion of said chassis side members and each having laterally extending portions for cooperating with another portion of said chassis side members for guiding the motor supporting members in their movements as they are being applied to and withdrawn from cooperative relationship with said spacers.

2. In a motor vehicle, the combination of a chassis having channel shaped side members, a motor, and motor supporting means comprising but two members, both of which extend between said chassis side members, spacers secured to said side members for positioning said supporting means, each of said two motor supporting members having feet for sliding on the lower flanges of said channel members and having laterally extending portions for guidedly cooperating with the webs of said channel members as the motor supporting members are being applied to and withdrawn from cooperative relationship with said spacers.

3. In a motor vehicle, the combination of a chassis having channel shaped side members, a motor, and motor supporting means comprising but two members, both of which extend between said channel members and have means for sliding on the lower flanges of said web members and means for being guided in said sliding movement, and spacing members secured to the web of said channel chassis members at points at which said motor supporting members are secured to said channel chassis members.

Signed at Doylestown, Ohio, this 20th day of May, 1924.

JOHN RIISE.